US009011127B2

(12) United States Patent
Carino et al.

(10) Patent No.: US 9,011,127 B2
(45) Date of Patent: Apr. 21, 2015

(54) METHOD AND SYSTEM FOR DETERMINING AND DISPENSING RESIN FOR A COMPRESSION MOLDING PROCESS FLOW

(75) Inventors: Wiljee Carino, Cabuyao (PH); Bernie Chrisanto Ang, Sto. Tomas (PH); Richard Laylo, Calamba (PH)

(73) Assignee: STMicroelectronics Inc., Cala Laguna (PH)

( * ) Notice: Subject to any disclaimer, the term of this patent is extended or adjusted under 35 U.S.C. 154(b) by 484 days.

(21) Appl. No.: 13/586,749

(22) Filed: Aug. 15, 2012

(65) Prior Publication Data

US 2014/0048976 A1  Feb. 20, 2014

(51) Int. Cl.
*B29C 39/10* (2006.01)
*B29C 43/58* (2006.01)
*B29C 31/00* (2006.01)
*B29C 37/00* (2006.01)

(52) U.S. Cl.
CPC ............... *B29C 43/58* (2013.01); *B29C 31/006* (2013.01); *B29C 31/008* (2013.01); *B29C 2043/5833* (2013.01); *B29C 2043/5841* (2013.01); *B29C 2037/903* (2013.01); *B29C 2037/906* (2013.01); *B29C 2037/80* (2013.01); *B29C 2043/5875* (2013.01)

(58) Field of Classification Search
CPC  B29C 31/006; B29C 31/008; B29C 2037/80; B29C 2037/903; B29C 2037/906; B29C 2043/5833; B29C 2043/5841; B29C 2043/5875
USPC .......................... 425/123, 253, 452, DIG. 117
See application file for complete search history.

(56) References Cited

U.S. PATENT DOCUMENTS

2011/0156033 A1* 6/2011 Bintang et al. ................... 257/48
2012/0114782 A1* 5/2012 Sho et al. ........................ 425/510

\* cited by examiner

*Primary Examiner* — Joseph S Del Sole
*Assistant Examiner* — Lawrence D Hohenbrink, Jr.
(74) *Attorney, Agent, or Firm* — Seed IP Law Group PLLC

(57) ABSTRACT

The present disclosure is directed to a system and method for forming a plurality of packaged dice on a carrier, the carrier including a storage medium configured to store an indication of a total number of unpackaged dice on the carrier. The forming includes providing a quantity of molding compound to a molding module based on the total number of the unpackaged dice on the carrier. The providing includes accessing the indication of the total number of the unpackaged dice on the carrier from the storage medium, determining the quantity of molding compound based on the indication of the total number of unpackaged dice on the carrier, and molding the unpackaged dice into the packaged dice using the quantity of molding compound.

20 Claims, 10 Drawing Sheets

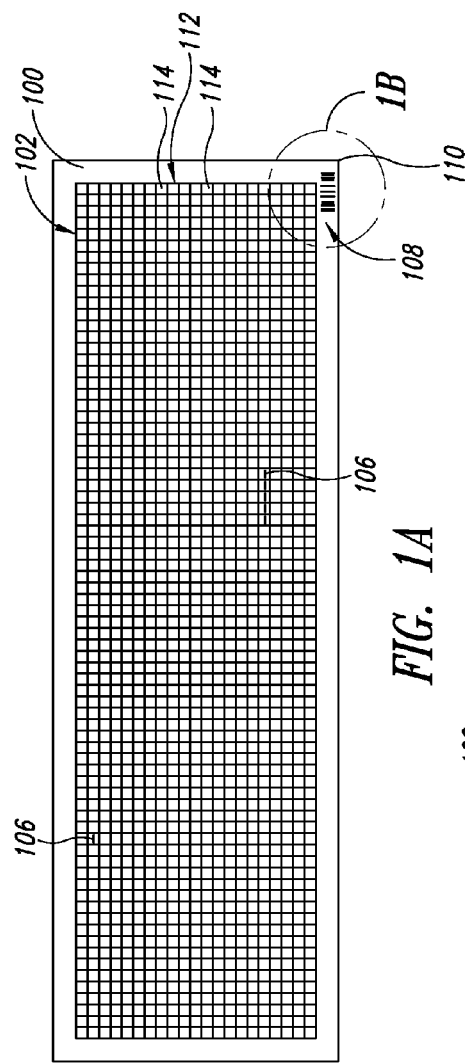
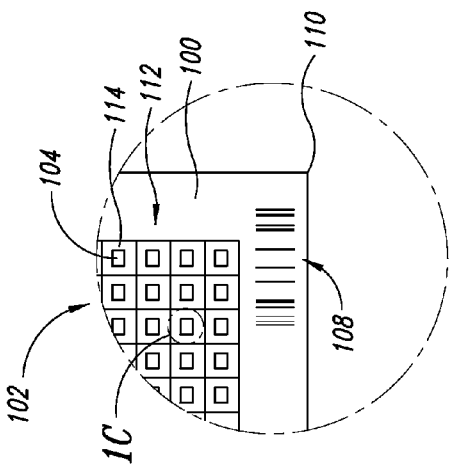
FIG. 1A
FIG. 1B

METHOD AND SYSTEM FOR DETERMINING AND DISPENSING RESIN FOR A COMPRESSION MOLDING PROCESS FLOW

BACKGROUND

1. Technical Field

The present disclosure is directed to a method and system for determining and dispensing resin accurately for a compression molding process flow.

2. Description of the Related Art

A variety of techniques are used to form packages for semiconductor dice (or dies). Manufacturers have parameters or specifications for their packages in order to have consistency in size, shape, and operation. Some techniques are more accurate than others in providing packages that meet the parameters set by the manufacturer.

For example, one technique is transfer molding in which a carrier, on which are a plurality of individual dice, is placed into a mold tool. The mold tool includes a top portion and a bottom portion that are configured to seal the carrier with the dice within a mold cavity. Pellets of mold compound are loaded into a mold pot bushing before the top and bottom portion are brought into contact. The pellets are moved by a transfer plunger from the mold pot bushing into the mold cavities.

Regardless of the number of dice on the carrier, the mold tool compensates for cull, which is excess mold compound from the mold cavity. For example, if a particular batch of dice are thicker, then the resulting cull from the transfer process will be thicker. At the other end of the spectrum, such as when fewer dice are placed on the carrier than the carrier can hold, the same amount of mold compound will result in negative cull. Negative cull exists when there is insufficient mold compound in the mold cavity due to dice missing from the carrier or other defects. This can result in cosmetic surface defects to the packages formed by the transfer molding.

Another technique used to form packages for semiconductor die is compression molding. Compression molding machines scan the carriers to determine a number of dice present on the carrier, the sizes of the dice on the carrier, and the thicknesses of the dice. This die scanning is performed by laser or camera based scanning devices within the compression molding devices. The data is processed within the molding devices to determine an amount of resin to dispense into a mold cavity to achieve a specific thickness of the packages.

If the data provided by the scanners is inaccurate, too much or too little resin is dispensed into the mold cavity. This can cause irregularities in the packages. The resin calculation utilizes the number of dice, the carrier dimensions, and the dice thicknesses, to determine the amount of resin. If any of these parameters are inaccurate, the amount of resin will be negatively impacted.

The scanning techniques, either laser or visual, are often imprecise. For example, some scanning techniques use a vacuum to hold the carrier flat during the scanning. However, in some instances, there is vacuum leakage, which causes the carrier to warp and thus results in an inaccurate scan. Warpage of the carrier can result in failure to detect different thicknesses between the dice and failure to detect the presence of thin dice.

The scanners have difficulty determining differences in thickness between dice on the carrier, small dice may not be detected during scanning, or the scanner may detect a die pad as a die even if a die is not present. If the die is thinner than detected, the amount of mold compound provided will be less than what the machine actually needs to form the package within a set of parameters. Alternatively, if the die is thicker than detected, the final package may be larger than the manufacturer's parameters.

In some circumstances, the inconsistencies in the final packages may cause the manufacturer to scrap or otherwise throw out the irregular packages. These inaccuracies in scanning reduce yield and are costly for the manufacturer.

BRIEF SUMMARY

Some embodiments of the present disclosure are directed to a method and system to provide accurate data regarding a number of dice on a carrier to determine an amount of molding compound to provide to a molding process.

One embodiment of the present disclosure is directed to a method that includes forming a plurality of packaged dice on a carrier, the carrier including a storage medium configured to store an indication of a total number of unpackaged dice on the carrier. The forming includes providing a quantity of molding compound to a molding module based on the total number of the unpackaged dice on the carrier. The providing includes accessing the indication of the total number of the unpackaged dice on the carrier from the storage medium, determining the quantity of molding compound based on the indication of the total number of unpackaged dice on the carrier, and molding the unpackaged dice into the packaged dice using the quantity of molding compound.

BRIEF DESCRIPTION OF THE SEVERAL VIEWS OF THE DRAWINGS

FIG. 1A is a top down view of a carrier having a frame with a plurality of dice;

FIG. 1B is an enlarged top down view of a corner of the carrier of FIG. 1B having a storage medium on the carrier;

DETAILED DESCRIPTION

Figure 1C:
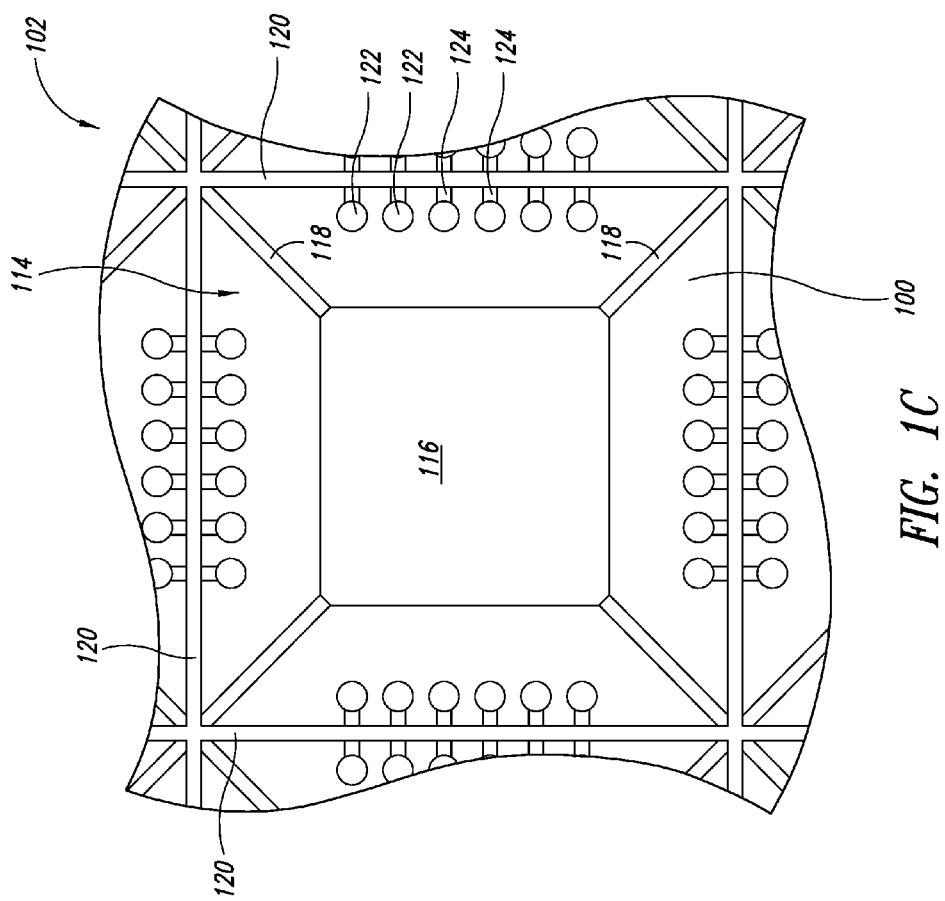
FIG. 1C is an enlarged top down view of a cell of the frame to be associated with a single die.

In the following description, certain specific details are set forth in order to provide a thorough understanding of various embodiments of the disclosure. However, one skilled in the art will understand that the disclosure may be practiced without these specific details. In other instances, well-known structures associated with manufacturing of semiconductor die have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

In addition, reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale. For example, the shapes of various features are not drawn to scale, and some of these features are enlarged and positioned to improve drawing legibility.

FIG. 1A is a top down view of a carrier 100 to be used with a compression molding process flow that is described in more detail below. The carrier 100 includes a frame 102 having a plurality of cells 114 arranged in rows and columns. Each cell 114 is configured to receive a respective die 104 (FIG. 1B).

Carriers such as the carrier 100 are used in packaging techniques to form a plurality of semiconductor packages in a single process flow instead of packaging each die 104 individually. Further details about the frame 102 and the carrier will be described in more detail below with respect to FIG. 1C and FIGS. 3A-3C.

The carrier 100 includes carrier identification information stored in a storage medium 108 at one corner 110 of the carrier. The storage medium 108 may be an RFID chip, a memory, a marking directly on the carrier, an etching in the carrier, or other means for providing information about the dice 104, the frame 102, and the carrier 100. For example, the storage medium 108 may store a carrier number, a carrier strip map, a batch number, a total number of dice 104 on the carrier, date information, carrier dimensions, a type of packaged to be formed, or other useful information for the manufacturer. The stored information may be in various formats such as a bar code format or any combination of letter and/or numbers.

The storage medium 108 may be scanned, read, or otherwise accessed to retrieve the data from the storage medium 108. In some embodiments, the storage medium 108 includes an indication of the total number of dice on the carrier. The indication may be a pointer to or a digital value indicative of a location in a memory, such as a memory on a remote server where all or some of the data regarding carrier is store. Alternatively, the indication may be readable directly from the storage medium. For example, if the storage medium is a bar code imprinted on the carrier, the bar code may be read to provide the total number of the dice on the carrier and other relevant data for the compression molding process flow.

FIG. 1B is an enhanced view of the corner of the carrier 100 where the storage medium 108 is more visible and the individual dice 104 can be seen. The carrier 100 includes an array 112 of the cells 114, in which a single die is configured to be placed in each individual cell 114. Each cell 114 is a portion of the frame that is configured to be separated from other equivalent portions of the frame once the dice have been packaged.

FIG. 1C is an enhanced view of one of the cells 114 of the frame 102 that has been placed on the carrier 100. Each cell 114 is configured to receive a die on a die pad 116 anchored in a center of the cell 114. The die pad 116 is anchored by a plurality of arms 118 that are connected to an exterior boundary 120 of each cell 114. The arms 118 support the die pad and keep the die in place during the molding process. In some embodiments, the die pad also acts as a heat sink during use of the final integrated circuit package.

The external boundary 120 is shared by adjacent cells 114. After the molding process is completed, the cells 114 are separated along the boundary 120 by sawing or another cutting process.

The cells 114 also include a plurality of bond pads 122 positioned along and adjacent to the boundary 120 on all sides of the cells 114. The bond pads 122 are coupled to the exterior boundary 120 by connections 124. The connections 124 are electrically connected together by the boundary 120, which may be metal. Prior to packaging, wire bonds may be formed to couple the die 104 to the bond pads 122. Once the individual cells have been molded and separated from one another, the connections 124 will not necessarily be electrically connected together.

Once the dice 104 are placed onto the carrier 100, the carrier strip map can be formed. The carrier strip map provides information about the number of usable dice of the strip and information about thicknesses of the dice. For example, often, there are cells 114 in the frame into which no dice 104 are placed or where the dice 104 are damaged, such that the number of dice 104 on the carrier 102 is not equal to the number of cells 114. The carrier strip map could include information, such as indications of locations 106 where no dice are present, see FIG. 1A. The locations are identified by a dash mark in the frame 102 to indicate places where the die are damaged or were not appropriately placed into the frame 102.

Figure 2:
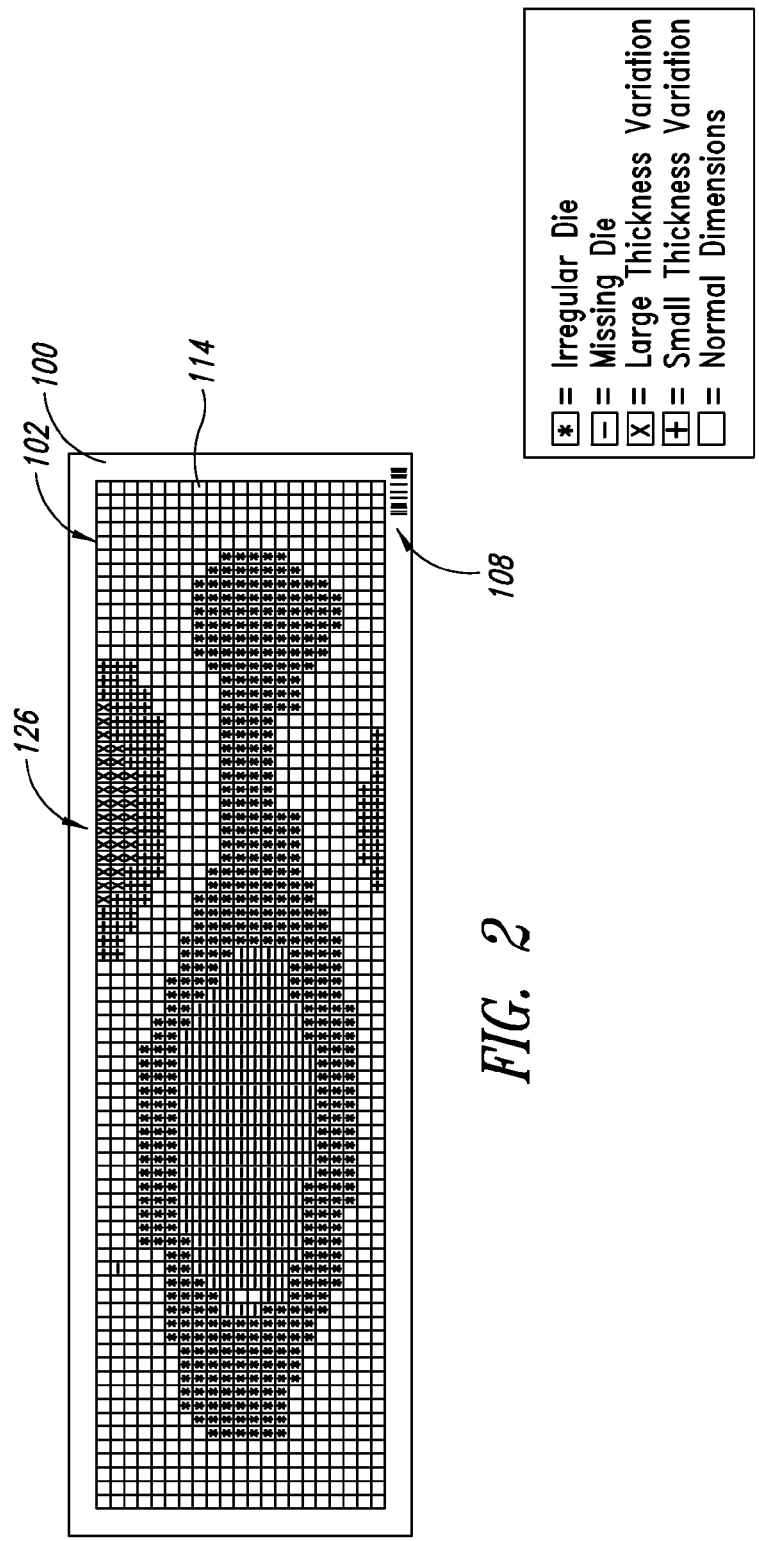
FIG. 2 is a top down view of the carrier showing contours of the dice on the carrier.

FIG. 2 is a top down view of the carrier 100 showing contours of the die on the frame 102 after the plurality of dice 104 have been attached to the frame. The contours 126 are detected and can be stored in the carrier strip map. The contours 126 may indicate that some cells 114 have irregular die, which are represented by an asterisk, '*' in FIG. 2. Missing die are represented by a hyphen, '−'. The die 104 having a thickness much larger than expected are represented by an x and die having a thickness slightly larger than expected are represented by a plus, '+'. The dice that have normal dimensions are represented by an empty cell.

As will be discussed in more detail below, this information about die location, missing dice, and die thickness is input into the compression molding device to determine the amount of resin to use in the molding process. When there are irregularities in the number of dice and in the thicknesses of the dice, the compression molding device can compensate for these changes in order to provide the correct amount of molding. If the correct amount of molding is not provided, then the entire batch of dice 104 on the carrier 102 may be compromised, such that the final packaging will be inadequate and the yield will be low.

As mentioned above, previous compression molding methods used lasers or cameras to scan the carrier 100 after placing the dice 104 in the cells 114. The scanning was imprecise and did not provide the compression molding machine with an accurate accounting of the dice, the thicknesses of the dice, and other information. The previous die scanning methods could not determine a difference between contours caused by warpage and contours caused by different thicknesses of the dice. Accordingly, inaccurate amounts of resin could be supplied to the mold chambers. These contours 126 are subtle irregularities that may have a large impact on the final packaging.

Figure 3A:
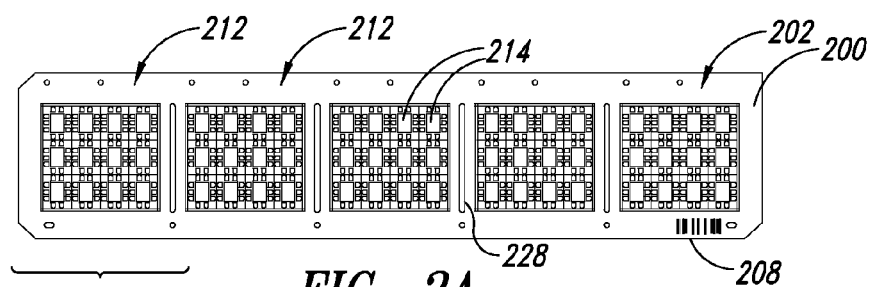
FIG. 3A is a top down view of an alternative embodiment of a carrier configured to receive a plurality of dice.

FIG. 3A is a top down view of an alternative carrier 200 having a plurality of arrays 212 of cells 214 of a frame 202. The frame 202 is a lead-frame substrate, which is typically formed of copper, and is configured to be packaged with dice to form integrated circuit packages. For example, the frame 202 once packaged may be a leadless lead-frame package or ball grid array package. The frame is formed by a separate manufacturing process, such as by stamping or etching.

There are five arrays 212 separated from each other by openings 228. The openings 228 may be provided for use by a handler or other device that moves the carrier 200 through the compression molding process flow. For example, the handler (not shown) may have ridges that fit into the openings 228 to hold and move the carrier 100 to various parts of the compression molding device. See FIG. 4 for more detail about the compression molding device.

The carrier 200 includes a storage medium 208 to save data about the dice and the carrier to be accessed and utilized by the compression molding machine.

Figure 3B:
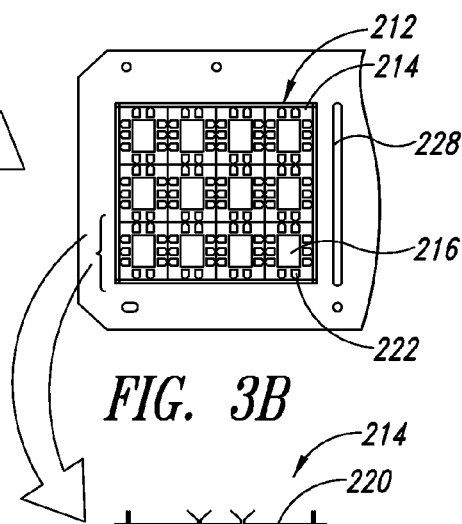
FIG. 3B is an enhanced view of one portion of the carrier in FIG. 3A.

In FIG. 3B, one of the arrays 212 is enlarged, so that the cells 214 are more visible. The array 212 includes three rows and four columns of the cells 214. Each cell 214 includes a die pad 216 and a plurality of bond pads 122. In addition, each cell 214 is separated from an adjacent cell by an external boundary 220, which will be cut in order to separate the packaged dice later in the process.

Figure 3C:
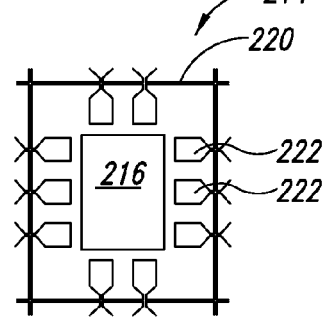
FIG. 3C is an enhanced view of a portion of a frame on the carrier from FIG. 3B.

FIG. 3C is an enlarged view of one of the cells 214 of the array 212 showing the die pad 216 and the bond pads 222. The cell 214 may be used to form a ball grid array package or solder balls may be connected to the bond pads 222.

As will be described in further detail below, one embodiment of the present disclosure is directed to a method of providing more accurate information about the contours and number of dice 104 on the frame in order to more accurately provide molding compound to a molding chamber.

Figure 6:
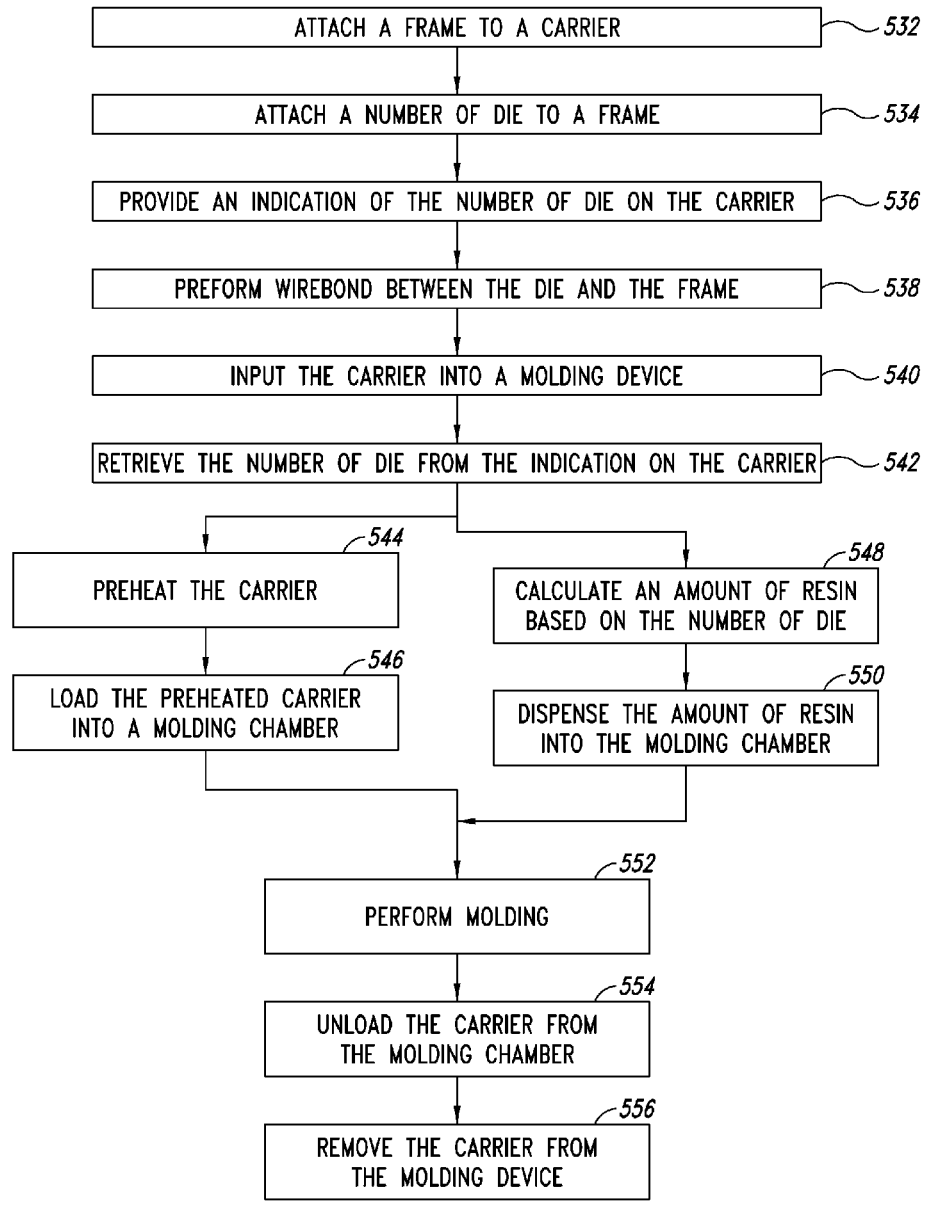
FIG. 6 is an alternative embodiment of a process flow for determining and dispensing resin for a compression molding process.
Figures 7A, 7B:
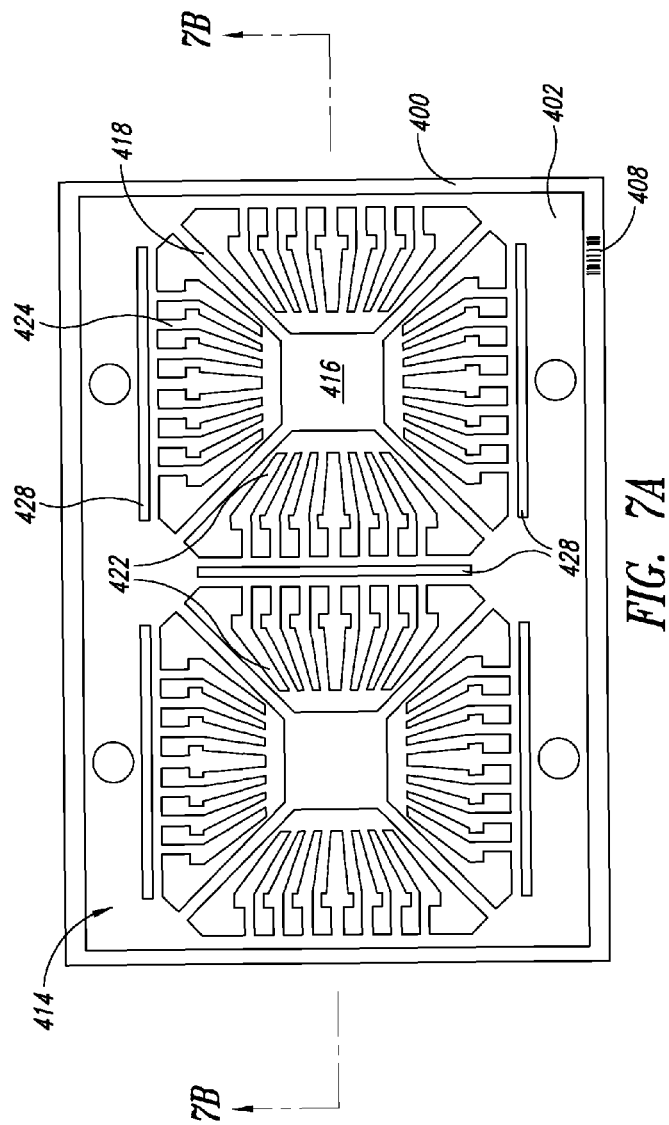
FIG. 7A is a top down view of a carrier having a frame according to an embodiment of the present disclosure.
FIG. 7B is a cross section of the frame on the carrier taken through FIG. 7A.
Figure 8:
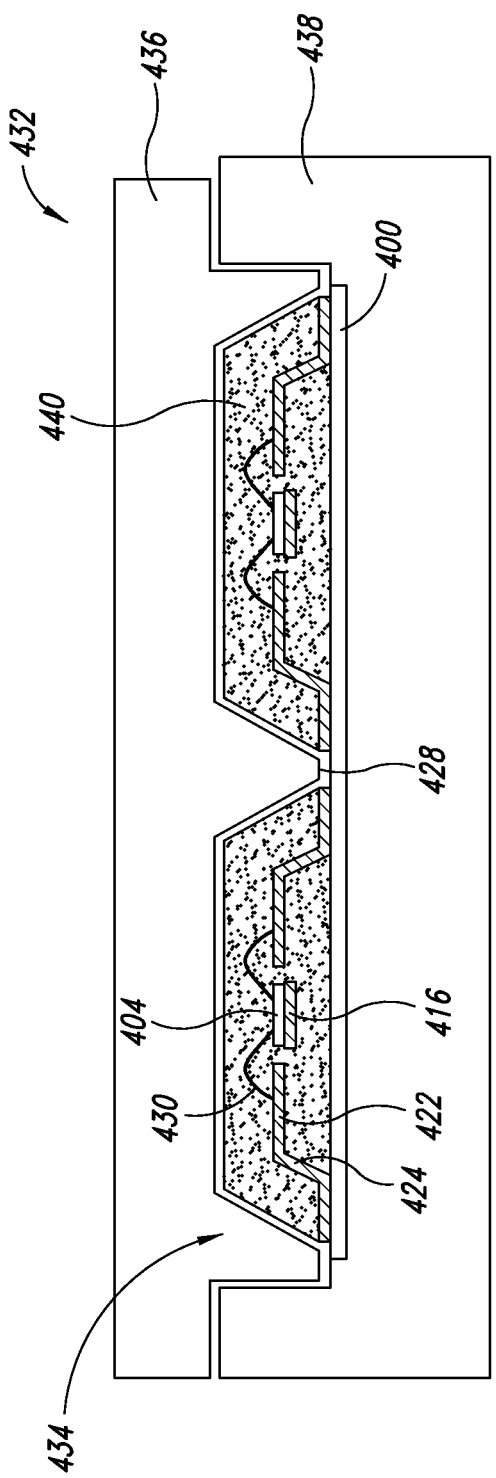
FIG. 8 is a cross sectional view of a compression molding machine including the frame and carrier from FIGS. 7A and 7B.

FIGS. 7A, 7B, and 8 will be discussed in conjunction with the system and method described in FIGS. 4-7 in order to easily follow how the compression molding process flow is executed in a compression molding device 432 to achieve the plurality of packaged dice.

Figure 4:
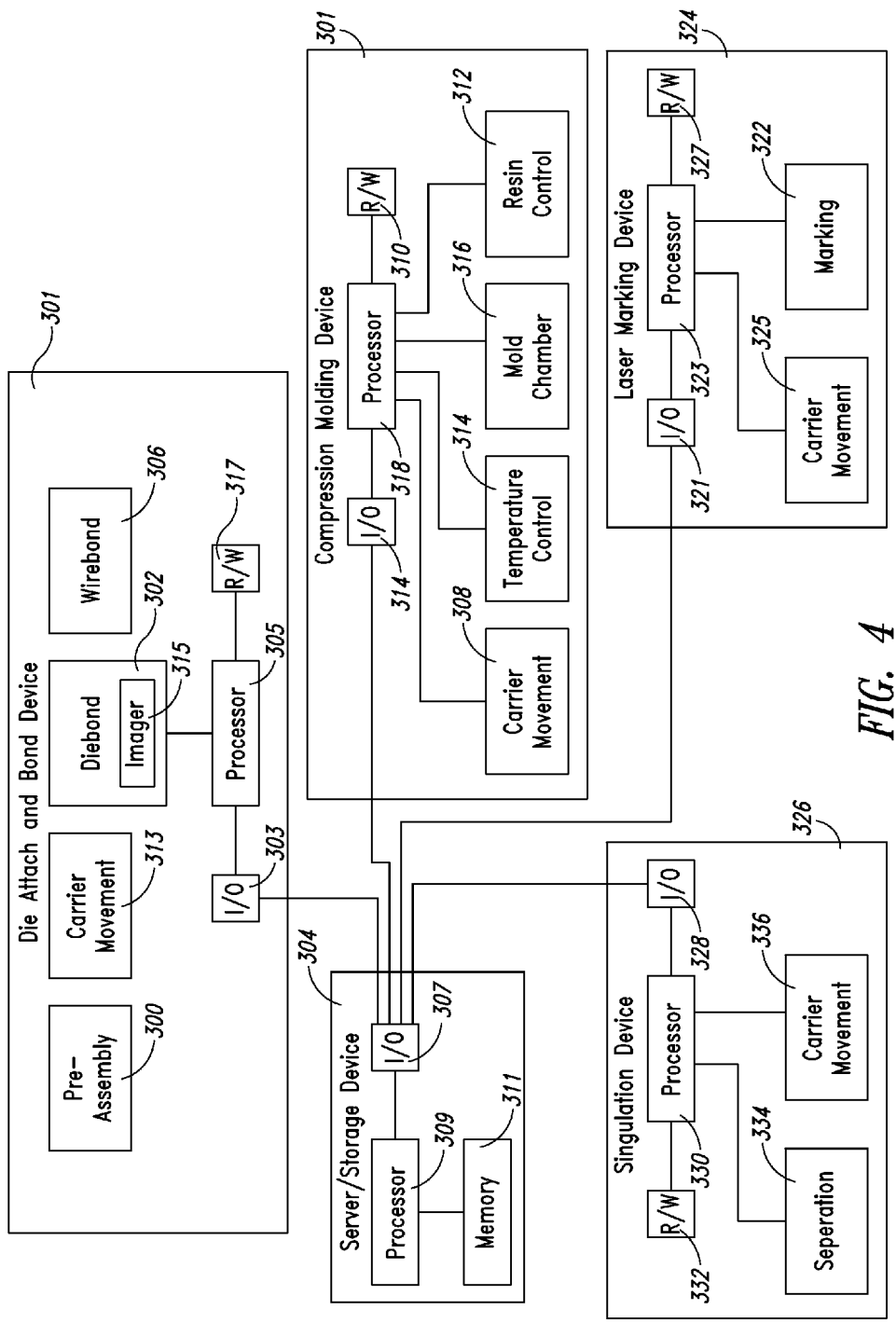
FIG. 4 is a block diagram of a process flow according to an embodiment of the present disclosure.

FIG. 4 is a block diagram of a system configured to determine and dispense resin for a compression molding process flow. Pre-assembly steps are executed in a pre-assembly module 300 in a die attach and bond device 301. The pre-assembly module 300 prepares a carrier 400 and a frame 402 to receive a plurality of dice, such as by attaching the frame to the carrier, see FIGS. 7A, 7B. The pre-assembly module may also determine a number of available die pads on the frame. In addition, the pre-assembly module may store the number of die pads, the type of package to be formed, and carrier identification information, such as carrier number and carrier dimensions, in the storage medium 408, see FIG. 7A.

In one embodiment, the pre-assembly module 300 transmits the number of die pads, the type of package to be formed, and carrier identification information to a server/storage device 304 through an input/output module (I/O) 303 and a processor 305 in the die attach and bond device 301. The server/storage device 304 is configured to be accessed by a variety of devices in the compression molding process flow. The server/storage device 304 also includes a processor 309 and an I/O module 307, which is configured to receive the information from the other devices and store the information in a memory 311.

The die attach and bond device 301 includes a carrier movement module 313 that moves the frame between the other modules in the die attach and bond device 301. A die bond module 302 that is configured to receive the carrier and place and bond a plurality of dice 404 with the frame in each one of a plurality of cells 414, see FIGS. 7A, 7B. A module is configured to pick up each singulated die 104 and place each individual die 404 on a die pad 416. As the module places each die, the module gathers data about the die and counts the number of dice that have been placed onto the carrier 400.

The dice are prepared for attachment to the frame by performing a visual inspection of the wafers before the wafers are singulated into the plurality of dice. Wafers that pass inspection are mounted on a backing tape that provides support for handling during the separating and the die bond process. Information about each of the dice may be transmitted and stored in the server/storage device 304 to be accessed by the die attach and bond device 301.

The die bond module 302 may include an imager 315 configured to detect and analyze the dice as the dice are attached to the die pads of the frame. The imager is configured to determine which die to take from the backing tape and attach to the frame, i.e., the imager can detect damaged die and will avoid picking up those die. As the imager 315 and the die bond module 302 gather information, the processor 305 in the die attach and bond device 301 counts the number of dice placed on the frame. Information about the thicknesses of each die and the number of dice placed on the frame are output from the die attach and bond device 301 to be stored in the memory 311 of the server/storage device 304.

As the imager 315 and the die bond module 302 place the dice on the carrier, a carrier strip map may be formed based on the thicknesses of the dice. The carrier strip map, along with other data, such as a carrier identification number, carrier dimensions, frame dimension, and the type of packaging may be stored in the memory 311 of the server/storage device 304. This data is useful for other modules in the packaging process, such as the molding process and laser marking, which will be discussed in more detail below.

In one embodiment, a pointer to a location in the memory 311 may be stored in the storage medium 408 directly on the carrier, see FIG. 7A. Alternatively, all of the data may be stored in the storage medium 408. For example, an indication can be provided in the storage medium of the total number of dice on the carrier. The indication can be a digital value that can be read from the storage medium, where the digital value is representative of the total number of dice. Alternatively, the indication may be a marking on the carrier, which can be read and interpreted to provide the total number of dice. In some embodiments, the indication can provide information about the carrier in addition to the total number of die on the carrier.

For example, the die attach and bond device 301 may include a read/write (R/W) module 317 configured to read the storage medium 408 and write additional information in the storage medium 408. The R/W module 317 is coupled to the processor 305. The processor receives the information and provides the useful information to the different modules. In addition, the processor indicates to the R/W module 317 what information should be stored in the storage medium.

The die attach and bond device 301 also includes a wire bond module 306 hat is configured to couple each die to the frame 402. For example, as shown in FIG. 9, wires 428 are coupled between the die 404 and the bond pad 422. In alternative embodiments the pre-assembly module 300, the die bond module 302, and the wire bond module 306 may be provided in separate devices.

After the die attach and bond device 301, the carrier is input into the compression molding device 432. The compression molding device 432 includes an I/O module 314 that is configured to transmit and receive information from the server/storage device 304. The compression molding device 432 also includes a processor 318 configured to control a carrier movement module 308, a temperature control module 314, a mold chamber module 316, and a resin control module 312. The carrier movement module 318 is configured to move the carrier 400 between the different modules in the compression molding device 432.

Once the carrier 400 is in the compression molding device, the molding device begins the process of determining the specific characteristics and features of the dice 404 and the carrier 400. As mentioned above, prior methods include scanning the carrier to determine a number of dice 404 on the carrier 400 and to determine thicknesses of the dice present. These scanning techniques are imprecise and can provide inaccurate data to the resin control module 312, which can result in too little or too much resin added to the molding chamber.

In order to improve the accuracy, the compression molding device 432 uses the indication stored in the server or in the storage medium 408 on the carrier to determine the total number of dice 404 on the carrier and the thicknesses of the dice. The total number of dice is provided by the die attach and bond device 301, which counted the dice placed on the frame.

The compression molding device 432 includes a read/write (R/W) module 310 that is configured to read the storage medium 408 for an indication of the number of dice. The number of dice may be stored directly in the storage medium or alternatively, the number of dice may be stored in the memory 311 of the server/storage device 304. Utilizing the number of dice as counted by the die attach and bond device 301 is more accurate than the previously described scanning techniques. The incorrect numbers of dice and the inaccurate thicknesses caused by warpage or other factors are avoided by not scanning the carrier once inside the compression molding device 432.

If the indication in the storage medium 408 on the carrier includes all of the data about the carrier and the number of die, the compression molding device 432 may scan, read, or otherwise obtain the data stored in the storage medium with the R/W module 310. In this way, the compression molding device 432 may be completely self contained, such that the request does not have to be made to another device outside of the compression molding device.

Utilizing information gathered during the pre-assembly and during the die bonding provides more accurate information about the number of dice than previous die scanning techniques conducted internally to the compression molding device. As mentioned above with respect to FIG. 2B, the contours 126, such as thickness data, can be determined and stored in the storage medium 408. This information can be utilized by the compression molding device to more accurately determine an amount of resin to dispense for a particular carrier 400. More accurate application of resin will result in more accurate packaging with fewer defects and higher yield.

In preparation for putting the carrier in the molding chamber, the data gathered from reading the storage medium with the R/W module 310 may be sent to the resin control module 312 simultaneously with pre-heating the carrier 400. Alternatively, these steps may be executed concurrently or sequentially.

The processor 318 controls the temperature control module 314 to preheat the carrier. Once the carrier has reached the pre-heat temperature, the carrier is moved by the carrier movement module 308 into molding chamber 434, see FIG. 8. The molding chamber 434 is controlled by the molding chamber module 316. For example, the molding chamber module 316 controls movement of a top and a bottom molding plate and controls an amount of pressure in the molding chamber 434. The molding chamber 434 of FIG. 8 is in a final stage of the molding process, such that packages 440 are formed and a top plate 436 is moving away from a bottom plate 438 of the molding chamber.

The resin control module 312 determines the amount of resin to be used with each specific carrier 400 based on the total number of dice, the thicknesses of the dice, the type of package to be formed, and other factors. The amount of resin is dispensed into the molding chamber 434. Once the carrier and the resin are in the molding chamber, the molding chamber module 316 moves the top plate 436 of the molding chamber 434 towards the bottom plate 438 of the molding chamber 434 to perform the molding process. The top and bottom plates are heated to continue to melt the resin to form an encapsulant or molding around the dice and the frames. In addition, a specific pressure is asserted on the resin and the chamber to form packages 440. A shearing action of the plates being compressed onto the resin, with the heat, causes the resin to become soft. The soft resin fills the cavity and is compressed by the pressure. These conditions form packages 440 that are heavy and dense and have high electrical, heat, and chemical resistance.

The specific amount of resin provided to the molding chamber 434 ensures that the top and bottom plate 436, 438 can be clamped closed around the carrier 400 and the frame 402 to heat and shape packages 440.

Once the molding is complete, the carrier 400 is unloaded from the molding chamber 434 and a post mold cure is preformed. The temperature control module 314 controls a temperature to cure the mold. Subsequently, the carrier movement module 308 moves the carrier from the compression molding device 432.

The carrier is moved to a laser marking device 324 where each of the packages 440 are laser marked. The laser marking device 324 includes an I/O module 321 that is configured to transmit and receive information from the server/storage device 304, such as the total number of dice on the carrier. The laser marking device 324 also includes a processor 323 configured to control a carrier movement module 325 and a marking module 322. In an alternative embodiment, the laser marking device 324 may retrieve the data from the storage medium 408 on the carrier with a R/W module 327.

The laser marking provides a visual indication on a surface of the packages 440, such as when exposed to laser radiation. Based on the carrier strip map stored in memory, the laser marking component can mark usable packages with a positive indication and can mark unusable packages, such as ones without dice with a negative indication. This will allow the manufacturer to easily sort good packages from bad packages after singulation.

Subsequently, the carrier is moved to a singulation device 326 that includes an I/O module 328, a processor 330, a R/W module 332, a carrier movement module 336, and a separation module 334. In the singulation device 326 the packages are separated into individual packages for testing or for sale.

Figure 5A:
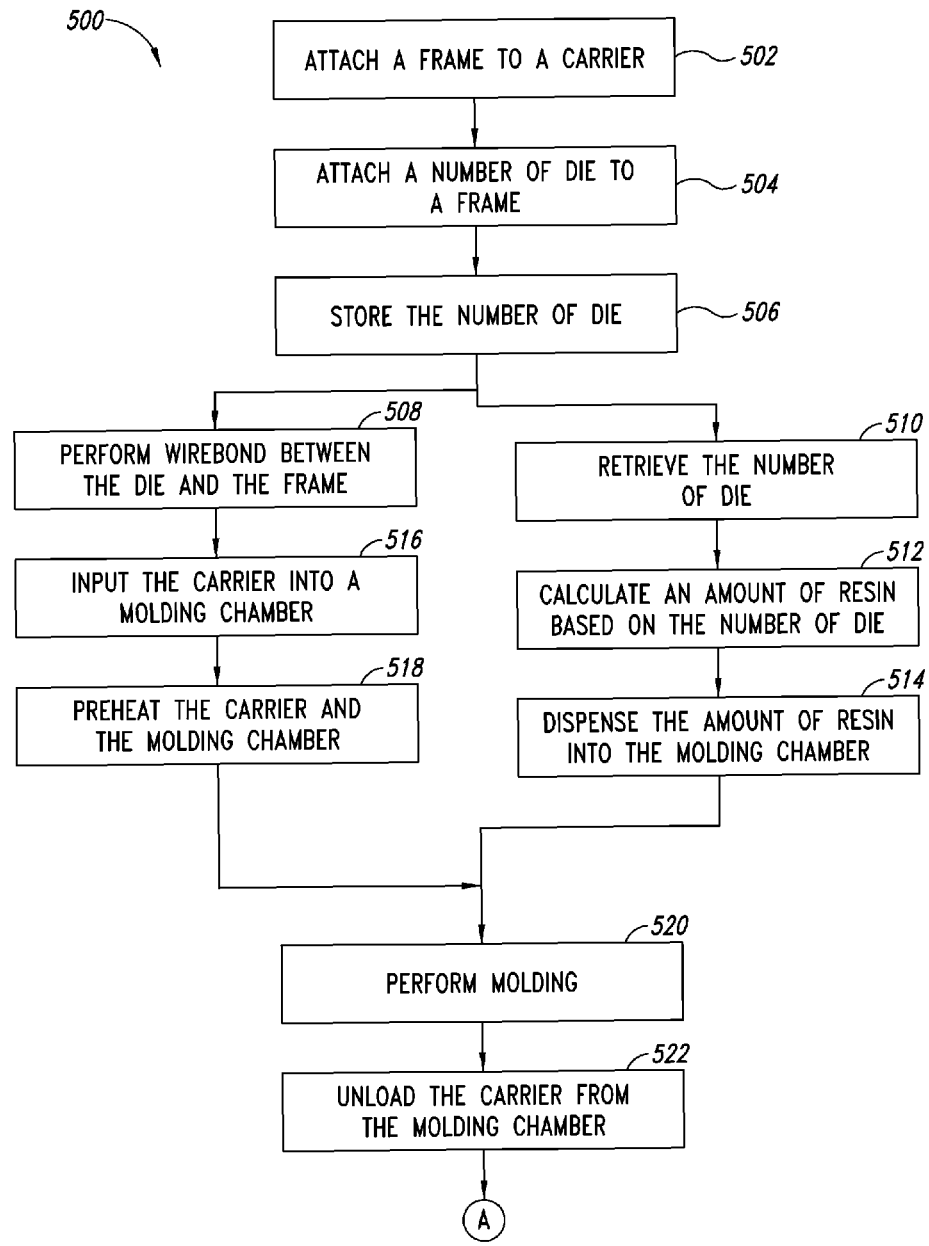
FIGS. 5A and 5B are a flowchart of a method of determining and dispensing resin for a compression molding process flow according to one embodiment of the present disclosure.

FIG. 5A is a flow chart of an embodiment of a method of the present disclosure. The method 500 includes attaching a frame to a carrier, at 502 and attaching a number of dice to the frame, at 504. As the number of dice are attached to the frame, a count is accumulated that represents the number of dice placed on the frame. The number of the dice is stored, at 506, in a memory. The memory may be in the server/storage device 304 of FIG. 4 or may be in the storage medium 408.

At 508, the method includes performing a wire bond between the frame and the die. At 510, the number of dice is retrieved from the memory in the server or on the carrier. The steps 508 and 510 may be performed sequentially, concurrently, or simultaneously.

At 512, an amount of resin appropriate for packaging the number of dice on the carrier is calculated. At 514, the amount of resin is dispensed into a molding chamber. Meanwhile, the carrier is being input into the molding chamber, at 516. At 518, the carrier is preheated in the molding chamber so that all of the elements associated with the molding chamber are prepared for the molding process. At 520, the molding is preformed to form packages of encapsulant or molding around the die. At 522, the carrier is unloaded from the chamber.

Figure 5B:
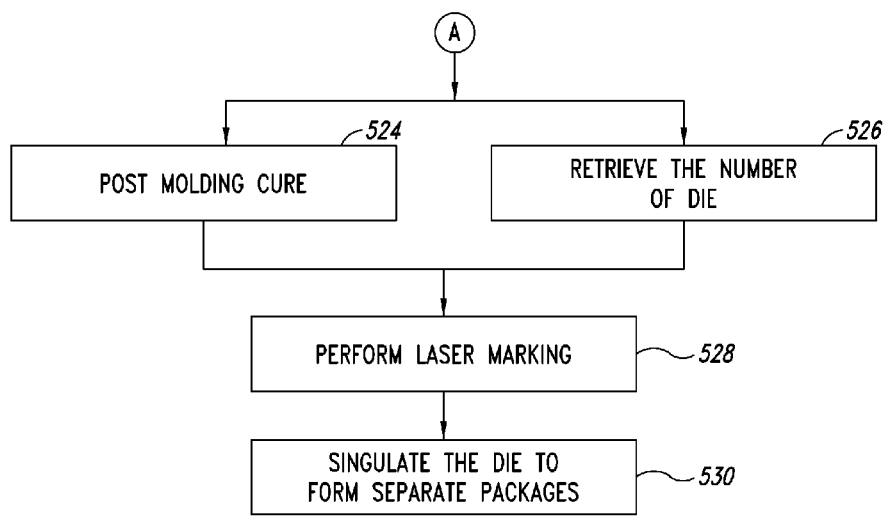

As shown in FIG. 5B, at 524, the carrier having the plurality of packaged dice is cured in a post mold curing processes. As the carrier is being cured, the number of dice is retrieved from the memory on the server or the carrier, at 526. The number of dice is utilized by the laser marking, performed at 528. In one embodiment, where the data is stored in the memory on the server, the data may only requested about the number of dice one time and shared throughout the method. Alternatively, if the data is read from the carrier each of the modules receiving carrier may be configured to access the indication on the storage medium.

At 530, the packages are singulated into a plurality of packaged dice. After singulation, the resultant packages can be mounted to a printed circuit board or other substrate using known techniques.

FIG. 6 is an alternative method of providing a number of dice to determine an amount of resin to provide in a molding process. At 532, a frame is attached to a carrier. At, 534, a number of dice are attached to die pads of the frame. At 536, an indication of the number of dice is provided on the carrier, such as in the storage medium referenced above.

At 538, a wire bond is preformed between the die and the frame. At 540, the carrier with the wire bonded die is input into a molding device. At 542, the molding device retrieves the number of dice from the indication on the carrier.

At 544, the carrier is preheated and then, at 546, the preheated carrier is located into a molding chamber. As the carrier is being pre-heated, the amount of resin is being calculated based on the number of dice, at 548. The amount of resin is dispensed into the molding chamber, at 550.

At 552, with the preheated carrier and the amount of resin in the molding chamber, the molding is preformed. At 554, the carrier is unloaded from the molding chamber. At 556, the carrier is removed from the molding device.

The methods of FIGS. 5A, 5B, and 6 reduce the components in the compression molding device because no laser or camera scanners are used to determine the number of dice. The information used by the resin calculation and dispense component is gathered by accessing the data stored in the storage medium on the carrier. A reading device will be included in the compression molding device; however, the complexity of the reading device is less than that of a laser scanner.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    forming a plurality of packaged dice on a carrier, the carrier including a storage medium configured to store an indication of a total number of unpackaged dice on the carrier, the forming including:
        providing a quantity of molding compound to a molding module based on the total number of the unpackaged dice on the carrier, the providing including:
            accessing the indication of the total number of the unpackaged dice on the carrier from the storage medium;
            determining the quantity of molding compound based on the indication of the total number of unpackaged dice on the carrier; and
        molding the unpackaged dice into the packaged dice using the quantity of molding compound.

2. The method of claim 1 wherein the indication is a digital value stored in the storage medium.

3. The method of claim 2 wherein accessing the indication of the total number of the unpackaged dice on the carrier from the storage medium includes:
    retrieving the digital value by reading the storage medium;
    transmitting the digital value to a server, the server being configured to store the total number of the unpackaged dice based on the digital value in a memory; and
    receiving the total number of the unpackaged dice on the carrier from the server.

4. The method of claim 2 wherein the digital value represents the total number of the unpackaged dice.

5. The method of claim 4 wherein accessing the indication of the total number of the unpackaged dice on the carrier from the storage medium includes retrieving the digital value by scanning the storage medium.

6. The method of claim 1 wherein the storage medium is a marking on the carrier.

7. The method of claim 6 wherein accessing the indication of the total number of the unpackaged dice on the carrier from the storage medium includes scanning the marking.

8. The method of claim 1 wherein forming the plurality of packaged dice on the carrier includes:
    attaching the unpackaged dice to die pads of a frame on the carrier;
    counting the dice as the dice are attached to the frame; and
    storing the total number of the unpackaged dice on the storage medium.

9. The method of claim 8 wherein storing the total number of the unpackaged dice includes:
    determining the indication by scanning the storage medium; and
    storing the total number of dice based on the indication in a memory.

10. The method of claim 8, further comprising coding the indication into the storage medium.

11. The method of claim 10 wherein the indication is a digital value.

12. A system, comprising:
a compression molding device configured to form a plurality of packaged dice on a carrier, the carrier including a storage medium configured to store an indication of a total number of unpackaged dice on the carrier, the device being configured to:
access the indication of the total number of unpackaged dice on the carrier from the storage medium;
determine a quantity of molding compound based on the indication of the total number of unpackaged dice on the carrier; and
mold the unpackaged dice into the packaged dice with the quantity of molding compound.

13. The system of claim 12 wherein the device is configured to request the total number of the unpackaged dice by transmitting the indication to a server, the server being configured to store the total number of the unpackaged dice associated with the indication in a memory, the device being configured to receive the total number of the unpackaged dice on the carrier from the server.

14. The system of claim 12 wherein the device is configured to read the indication from the storage medium to access the total number of the unpackaged dice on the carrier.

15. The system of claim 12 being further configured to:
attach the total number of the unpackaged dice to die pads of a frame on the carrier;
count the dice as the dice are attached to the frame; and
store the total number of the unpackaged dice on the storage medium.

16. The system of claim 15 being further configured to:
scan the storage medium to determine the indication; and
store the total number of the unpackaged dice based on the indication in a memory.

17. The system of claim 16 being further configured to:
request the total number of the unpackaged dice from the memory using the indication; and
receive the total number of the unpackaged dice on the carrier from the server.

18. A device, comprising:
a carrier;
a frame on the carrier, the frame configured to receive a plurality of unpackaged dice; and
a storage medium on the carrier, the storage medium being configured to store an indication of a total number of unpackaged dice received by the carrier.

19. The device of claim 18, wherein the storage medium is a physical marking on the carrier and the indication is coded into the marking.

20. The device of claim 18, wherein the indication is a digital value stored in the storage medium.

* * * * *